United States Patent
Sato

(10) Patent No.: US 10,590,253 B2
(45) Date of Patent: Mar. 17, 2020

(54) RUBBER COMPOSITION FOR FLAME-RETARDANT HOSE, AND FLAME-RETARDANT HOSE

(71) Applicant: The Yokohama Rubber Co., LTD., Minato-ku, Tokyo (JP)

(72) Inventor: Aya Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 36 days.

(21) Appl. No.: 15/743,261

(22) PCT Filed: Jun. 28, 2016

(86) PCT No.: PCT/JP2016/069081
§ 371 (c)(1),
(2) Date: Jan. 9, 2018

(87) PCT Pub. No.: WO2017/010278
PCT Pub. Date: Jan. 19, 2017

(65) Prior Publication Data
US 2018/0201750 A1 Jul. 19, 2018

(30) Foreign Application Priority Data
Jul. 13, 2015 (JP) .................... 2015-139793

(51) Int. Cl.
*C08K 3/016* (2018.01)
*C08K 3/04* (2006.01)
(Continued)

(52) U.S. Cl.
CPC ............ *C08K 3/016* (2018.01); *C08K 3/04* (2013.01); *C08K 3/36* (2013.01); *C08L 9/06* (2013.01);
(Continued)

(58) Field of Classification Search
None
See application file for complete search history.

(56) References Cited

U.S. PATENT DOCUMENTS 5,696,197 A * 12/1997 Smith .................. C08J 3/226
152/905
2006/0263556 A1* 11/2006 Beck .................. C08L 31/04
428/36.9
(Continued)

FOREIGN PATENT DOCUMENTS

CN 103946300 7/2014
CN 104379659 2/2015
(Continued)

OTHER PUBLICATIONS

International Search Report for International Application No. PCT/JP2016/069081 dated Sep. 20, 2016, 4 pages, Japan.
(Continued)

*Primary Examiner* — Joseph D Anthony
(74) *Attorney, Agent, or Firm* — Thorpe North & Western

(57) ABSTRACT

The present technology provides a rubber composition for a flame-retardant hose, the composition containing a rubber component, a carbon black, and a silica, wherein the rubber component is only chloroprene rubber or only chloroprene rubber and styrene-butadiene rubber; and a flame-retardant hose including a rubber layer formed using the rubber composition for a flame-retardant hose.

3 Claims, 1 Drawing Sheet

(51) Int. Cl.
*C08K 3/36* (2006.01)
*F16L 11/08* (2006.01)
*C08L 9/06* (2006.01)
*C08L 11/00* (2006.01)
*C08K 3/22* (2006.01)

(52) U.S. Cl.
CPC ...... *C08L 11/00* (2013.01); *C08K 2003/2227* (2013.01); *C08L 2201/02* (2013.01)

(56) References Cited

U.S. PATENT DOCUMENTS

| | | | |
|---|---|---|---|
| 2006/0270783 A1* | 11/2006 | Beck | F16L 11/06 524/564 |
| 2011/0112212 A1* | 5/2011 | Kimura | B60C 1/0016 523/156 |
| 2012/0108737 A1* | 5/2012 | Shibata | C08C 19/12 524/575 |
| 2013/0344269 A1 | 12/2013 | Abe et al. | |
| 2014/0058055 A1* | 2/2014 | Yamagishi | C08L 11/00 526/294 |
| 2014/0329035 A1 | 11/2014 | Tsunenishi | |
| 2015/0183970 A1 | 7/2015 | Miyamoto et al. | |
| 2016/0130429 A1 | 5/2016 | Tsunenishi | |
| 2018/0127570 A1 | 5/2018 | Tsunenishi | |
| 2018/0142090 A1 | 5/2018 | Tsunenishi | |

FOREIGN PATENT DOCUMENTS

| | | |
|---|---|---|
| JP | H02-163140 | 6/1990 |
| JP | 2009-083421 | 4/2009 |
| JP | 2013-129684 | 7/2013 |
| JP | 2013-249408 | 12/2013 |
| JP | 2014-009333 | 1/2014 |
| JP | 2014-214188 | 11/2014 |
| JP | 2014-228043 | 12/2014 |
| JP | 2017-002173 | 1/2017 |
| JP | 2017-002174 | 1/2017 |
| JP | 2017-002175 | 1/2017 |
| WO | WO 2012/124442 | 9/2012 |
| WO | WO 2013/076989 | 5/2013 |
| WO | WO 2014/007220 | 1/2014 |
| WO | WO 2014/188676 | 11/2014 |
| WO | WO 2016/199386 | 12/2016 |
| WO | WO 2016/199387 | 12/2016 |
| WO | WO 2016/199389 | 12/2016 |

OTHER PUBLICATIONS

Xu Dingyu et al., Technical Manual of the Field: Technical Manual of Plastic Rubber Formulation, Chemical Industry Press, May 2002, p. 114, 7 pages, China.

Abrasion Resistance of Neoprene, "Rubber Reference", Oxford, China Academic Journal Electronic Publishing House, 1996, pp. 19-25, vol. 26, No. 3, 14 pages, China.

Chinese Office Action for Chinese Application No. 201680034717.5 dated Dec. 9, 2019, 17 pages, China.

* cited by examiner

RUBBER COMPOSITION FOR FLAME-RETARDANT HOSE, AND FLAME-RETARDANT HOSE

TECHNICAL FIELD

The present technology relates to a rubber composition for a flame-retardant hose and a flame-retardant hose.

BACKGROUND ART

Conventionally, hoses having a rubber layer formed using a rubber composition having flame retardancy have been proposed.

For example, Japanese Unexamined Patent Application Publication No. 2013-129684 discloses a rubber composition for a hose including chloroprene rubber, butadiene rubber, and styrene-butadiene rubber as rubber components, from 60 to 80 parts by mass of the chloroprene rubber, and from 5 to 25 parts by mass of silica per 100 parts by mass of the rubber components.

When the present inventors prepared and evaluated rubber compositions containing chloroprene rubber, styrene-butadiene rubber, and butadiene rubber according to Japanese Unexamined Patent Application Publication No. 2013-129684, they found that such rubber compositions sometimes have low flame retardancy.

SUMMARY

The present technology provides a rubber composition for a flame-retardant hose having excellent flame retardancy.

The present technology provides a flame-retardant hose and comprises the following configuration.

1. A rubber composition for a flame-retardant hose, the composition including a rubber component, a carbon black, and a silica, the rubber component being only chloroprene rubber or only chloroprene rubber and styrene-butadiene rubber.

2. The rubber composition for a flame-retardant hose according to the above 1, wherein:
the rubber component is only chloroprene rubber and styrene-butadiene rubber; and a content of the chloroprene rubber is not less than 70 parts by mass per 100 parts by mass of the rubber component.

3. The rubber composition for a flame-retardant hose according to the above 1 or 2, wherein a content of the carbon black is greater than 65 parts by mass and not greater than 90 parts by mass per 100 parts by mass of the rubber component.

4. The rubber composition for a flame-retardant hose according to any one of the above 1 to 3, wherein a content of the silica is from 5 to 25 parts by mass per 100 parts by mass of the rubber component.

5. A flame-retardant hose including a rubber layer formed using the rubber composition for a flame-retardant hose described in any one of the above 1 to 4.

The rubber composition for a flame-retardant hose of the present technology has excellent flame retardancy.

The flame-retardant hose of the present technology has excellent flame retardancy.

DETAILED DESCRIPTION

Figure 1:
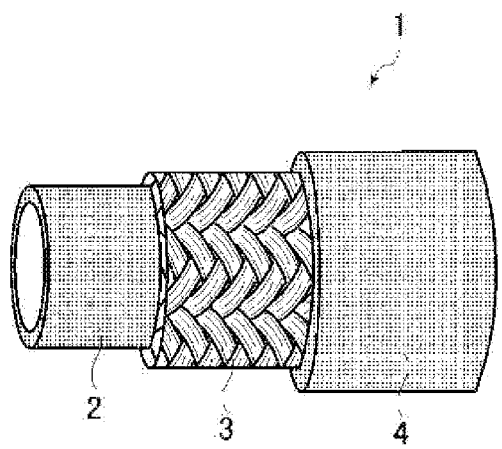
FIG. 1 is a perspective view illustrating a cutaway of each layer of an example of the flame-retardant hose of the present technology.

Embodiments of the present technology are described in detail below.

Note that, in the present specification, numerical ranges indicated using "(from) . . . to . . . " include the former number as the lower limit value and the latter number as the upper limit value.

Furthermore, in the present specification, when a component includes two or more substances, the content of that component indicates the total content of the two or more substances.

In the present technology, in cases where flame retardancy is superior, it is stated as "exhibiting superior effect of the present technology."

Rubber Composition for Flame-Retardant Hose

The rubber composition for a flame-retardant hose of the present technology (rubber composition of the present technology) is a rubber composition for a flame-retardant hose containing a rubber component, a carbon black, and a silica, wherein the rubber component is only chloroprene rubber, or only chloroprene rubber and styrene-butadiene rubber.

The rubber composition of the present technology is thought to achieve the desired effects as a result of having such a configuration. Although the reason for this is unknown, the reason is presumed to be as follows.

It is thought that a rubber composition containing chloroprene rubber, styrene-butadiene rubber, and butadiene rubber as rubber components has poor polymer blending properties, and due to such low polymer blending properties, the rubber composition does not become uniform, and consequently, the flame retardancy of the rubber obtained from this rubber composition is low.

In contrast, it is thought that when the rubber components do not include butadiene rubber but include only chloroprene rubber or chloroprene rubber and styrene-butadiene rubber, polymer blending properties are excellent and the composition becomes uniform, and consequently, flame retardancy is excellent.

Each of the components contained in the rubber composition of the present technology will be described in detail below.

Chloroprene Rubber

The chloroprene rubber (CR) included in the rubber composition of the present technology is not particularly limited. Examples thereof include conventionally known chloroprene rubbers. One type of chloroprene rubber can be used alone or a combination of two or more can be used.

Styrene-butadiene Rubber

The styrene-butadiene rubber (SBR) contained in the rubber composition of the present technology is not particularly limited. Examples thereof include conventionally known styrene-butadiene rubbers.

The weight average molecular weight of the styrene-butadiene rubber is preferably from 250000 to 1200000, and preferably from 400000 to 600000 from the perspective of exhibiting superior effect of the present technology and excellent wear resistance and processability. In the present technology, the weight average molecular weight of the styrene-butadiene rubber is a value calibrated with polystyrene standard based on a measured value obtained by gel permeation chromatography (GPC) using tetrahydrofuran (THF) as a solvent.

Styrene-butadiene rubber is preferably a styrene-butadiene rubber produced by emulsion polymerization (emulsion polymerized SBR) from the perspectives of being highly versatile, inexpensive, and excellent processability, such as cohesion or roll winding characteristics, of the discharged unvulcanized rubber after mixing in a Banbury mixer or the like.

The method of emulsion polymerization is not particularly limited.

Examples thereof include conventionally known methods.

One type of styrene-butadiene rubber can be used alone or a combination of two or more types can be used.

Rubber Components

In the rubber composition of the present technology, the rubber components are only chloroprene rubber, or only chloroprene rubber and styrene-butadiene rubber.

The rubber composition of the present technology does not substantially contain rubbers other than chloroprene rubber and styrene-butadiene rubber as rubber components. In the present technology, the above "does not substantially contain rubbers" means that the content of the above rubbers is from 0 to 1 mass % based on the total mass of rubber components. An example of rubbers other than chloroprene rubber and styrene-butadiene rubber is butadiene rubber.

When the rubber components are only chloroprene rubber and styrene-butadiene rubber, the content of chloroprene rubber is preferably not less than 70 parts by mass, and more preferably from 80 to 90 parts by mass, per 100 parts by mass of the rubber components from the perspective of exhibiting superior effect of the present technology.

Carbon Black

The carbon black contained in the rubber composition of the present technology is not particularly limited.

Examples of the carbon black include furnace blacks such as general purpose furnace (GPF) carbon black, high abrasion furnace (HAF) carbon black, super abrasion furnace (SAF) carbon black, intermediate super abrasion furnace (ISAF) carbon black, fast extruding furnace (FEF) carbon black, semi-reinforcing furnace (SRF) carbon black, and MAF carbon black; and thermal blacks such as fine thermal (FT) carbon black and medium thermal (MT) carbon black.

The method for producing the carbon black is not particularly limited.

One type of carbon black can be used alone or a combination of two or more types can be used.

In the present technology, the content of carbon black is preferably greater than 65 parts by mass and not greater than 90 parts by mass, and more preferably from 66 to 75 parts by mass, per 100 parts by mass of the rubber components from the perspective of exhibiting superior effect of the present technology and an excellent balance of wear resistance and processability.

Silica

The silica contained in the rubber composition of the present technology is not particularly limited. Examples include natural silica, molten silica, amorphous silica, hollow silica, fumed silica, and the like.

The method for producing the silica is not particularly limited. Examples include wet methods and dry methods.

One type of silica can be used alone or a combination of two or more types can be used.

The content of silica is preferably from 5 to 25 parts by mass, and more preferably from 10 to 20 parts by mass, per 100 parts by mass of the rubber components from the perspective of exhibiting superior effect of the present technology.

In the rubber composition of the present technology, the mass ratio of silica to carbon black (silica/carbon black) is preferably from 0.06 to 0.40 and more preferably from 0.10 to 0.30 from the perspective of exhibiting superior effect of the present technology and an excellent balance of wear resistance and process ability.

Other Components

The rubber composition of the present technology may further contain components other than the components described above (other components). Examples of other components include fillers other than carbon black and silica; flame retardants; anti-aging agents, antioxidants, anti-corrosion agents, photostabilizers, ultraviolet absorbents, polymerization inhibitors, silane coupling agents, vulcanizing agents such as sulfur, cross-linking agents, organic peroxides, vulcanization accelerators, vulcanization aids, magnesium oxide, zinc oxide, oils, plasticizers, and stearic acid. The content of each of the above components may be selected as appropriate.

From the perspective of achieving excellent wear resistance, an example of a preferable aspect of the rubber composition of the present technology is one that does not substantially contain aluminum hydroxide. In the present technology, the above "does not substantially contain aluminum hydroxide" means that the content of aluminum hydroxide is from 0 to 0.1 mass % based on the total mass of the rubber composition of the present technology.

Method for Producing Rubber Composition

The method for producing the rubber composition of the present technology is not particularly limited. An example of the method for producing the rubber composition is a method including kneading the predetermined rubber components, carbon black and silica, and other components that can be used as necessary (excluding vulcanizing agents, vulcanization aids, vulcanization accelerators, and zinc oxide) in a Banbury mixer or the like to obtain a mixture, then adding the vulcanizing agents, vulcanization aids, vulcanization accelerators, and zinc oxide to the mixture, and kneading with a kneading roll.

Conditions for vulcanization of the rubber composition of the present technology are not particularly limited. For example, the rubber composition of the present technology may be vulcanized by heating at a temperature of approximately 130° C. to 180° C. for 15 minutes to 200 minutes.

Application

The rubber composition of the present technology may be used for producing a flame-retardant hose.

Flame-retardant Hose

The flame-retardant hose of the present technology is a flame-retardant hose including a rubber layer formed using the rubber composition for a flame-retardant hose of the present technology.

The flame-retardant hose of the present technology has excellent flame retardancy because it has a rubber layer formed using the rubber composition of the present technology.

The rubber composition for a flame-retardant hose used in the flame-retardant hose of the present technology is not particularly limited as long as it is the rubber composition for a flame-retardant hose of the present technology.

Examples of the rubber layers of the flame-retardant hose of the present technology include an inner side rubber layer and a cover rubber layer. The flame-retardant hose of the present technology includes at least a cover rubber layer, and an example of a preferable aspect is one in which the cover rubber layer is formed using the rubber composition of the present technology.

The flame-retardant hose of the present technology may further include an intermediate rubber layer. The rubber composition that forms the intermediate rubber layer is not particularly limited. Examples thereof include conventionally known compositions. The intermediate rubber layer may be formed using the rubber composition of the present technology. The flame-retardant hose of the present technology may include one or a plurality of intermediate rubber layers.

The rubber composition that forms the inner side rubber layer is not particularly limited. Examples thereof include conventionally known rubber compositions. The inner side rubber layer may be formed using the rubber composition of the present technology.

When the flame-retardant hose of the present technology includes a plurality of rubber layers, it may include reinforcing layers between the rubbers layers. Note that when an intermediate rubber layer and a reinforcing layer are adjacent, the adjacent intermediate rubber layer and reinforcing layer are sometimes collectively called an intermediate rubber reinforcement layer. The intermediate rubber reinforcement layer may be one or a plurality of layers.

Here, an example of a preferred embodiment of the flame-retardant hose of the present technology is described below while referencing the attached drawings. However, the present technology is not limited to the attached drawings.

FIG. 1 is a perspective view illustrating a cutaway of each layer of an example of the flame-retardant hose of the present technology.

As illustrated in FIG. 1, a flame-retardant hose 1 includes an inner side rubber layer 2 as an inner tube, and a reinforcing layer 3 and a cover rubber layer 4 as an outer tube on top of the inner side rubber layer 2.

Figure 2:
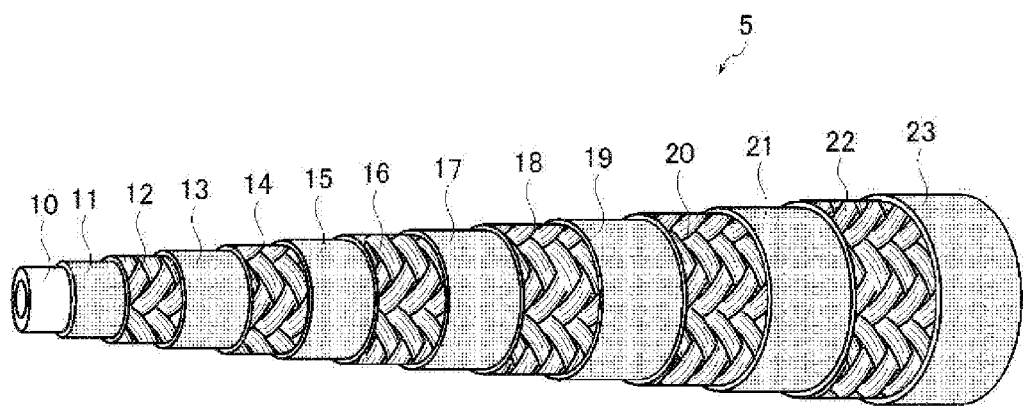
FIG. 2 is a perspective view illustrating a cutaway of each layer of another example of the flame-retardant hose of the present technology.

FIG. 2 is a perspective view illustrating a cutaway of each layer of another example of the flame-retardant hose of the present technology.

As illustrated in FIG. 2, a flame-retardant hose 5 is a hose including an inner side rubber layer 10 as the innermost layer, a cover rubber layer 23 as the outermost layer, and intermediate rubber layers 11, 13, 15, 17, 19, and 21 and reinforcing layers 12, 14, 16, 18, 20, and 22 between the inner side rubber layer 10 and the cover rubber layer 23, wherein the intermediate rubber layers and reinforcing layers alternate.

Next, the rubber layers (inner side rubber layer, cover rubber layer, or intermediate rubber layer) and reinforcing layers constituting the flame-retardant hose of the present technology will be described in detail.

Rubber Layers

The thickness of the inner side rubber layer is preferably from 0.2 to 4.0 mm, and more preferably from 0.4 to 2.5 mm.

The thickness of the cover rubber layer is preferably from 0.2 to 4.0 mm, and more preferably from 0.4 to 2.5 mm.

The thickness of the intermediate rubber layer is preferably from 0.2 to 0.7 mm, and more preferably from 0.3 to 0.5 mm.

Reinforcing Layers

The reinforcing layers are layers provided from the perspective of maintaining strength. The reinforcing layers may be provided on the outer side of a rubber layer (for example, on the outer side of at least one rubber layer selected from the group consisting of the inner side rubber layer, intermediate rubber layer, and cover rubber layer).

In the present technology, the reinforcing layers may be formed in a blade shape or in a helical shape.

Furthermore, the material that forms the reinforcing layers is not particularly limited, and conventionally known metal wire or various fiber materials (for example, nylon, and polyester) may be used.

Other Rubber Layers, Resin Layers

The flame-retardant hose of the present technology may further include other rubber layers and resin layers between the rubber layers and reinforcing layers.

The rubber materials that form the other rubber layers are not particularly limited, and may be, for example, the rubbers used in producing the rubber composition of the present technology.

Furthermore, the resin material that forms the resin layers is not particularly limited, and conventionally known polyamide resin, polyester resin, and the like may be used.

Method for Producing Flame-Retardant Hose

The method for producing the flame-retardant hose of the present technology is not particularly limited, and a conventionally known method may be used.

A specific suitable example is a method wherein an inner side rubber layer, one or a plurality of intermediate rubber reinforcement layers, and a cover rubber layer are layered in that order on a mandrel, and then this laminate, further covered with a nylon cloth, is submitted to steam vulcanization, oven vulcanization (heat vulcanization), or hot water vulcanization at 140° C. to 190° C. for 30 to 180 minutes to vulcanization bond it.

Applications of Flame-retardant Hose

The flame-retardant hose of the present technology may be used as, for example, a hydraulic hose, a hose for transporting refrigerant, and a marine hose.

EXAMPLES

The present technology is described below in detail using examples but the present technology is not limited to such examples.

Production of Rubber Composition

Rubber compositions were prepared by blending the components shown in the following Table 1 in the proportions (part by mass) shown in the table. Note that when producing each of the rubber compositions, the components shown in Table 2 below were additionally used as common compounds in the proportions (part by mass) shown in the table.

Specifically, a master batch was obtained by first kneading all of the components shown in Tables 1 and 2 below, except the zinc oxide, the vulcanization accelerator, and the sulfur, for 4 minutes in a (3.4-L) Banbury mixer, and then discharging the kneaded product when the temperature reached 160° C.

Then, the zinc oxide, the vulcanization accelerator, and the sulfur were added to the obtained master batch, and these were kneaded by an open roll to obtain a rubber composition.

Evaluation

The following evaluations were performed using the rubber compositions produced as described above. The results are shown in Table 1.

Flame Retardancy

Evaluation Samples

Each of the rubber compositions produced as described above was press vulcanized in a mold at 148° C. for 45 minutes, and an evaluation sample obtained by cutting a piece measuring 150 mm long, 12.7 mm wide, and 2.5 mm thick from the obtained vulcanized rubber sheet was used in evaluation of flame retardancy (flame extinguishing time and afterglow extinguishing time).

Flame Retardancy (Flame Extinguishing Time)

Flame retardancy (flame extinguishing time) was evaluated based on the flame retardancy (flame extinguishing time) evaluation of ASTP5007 of the MSHA standard (U.S. Mine Safety and Health Administration standard) (version 2012-02-12) using the evaluation samples obtained as described above.

A smaller numeric value of flame extinguishing time (units: seconds) indicates superior flame retardancy.

Flame Retardancy (Afterglow Extinguishing Time)

Flame retardancy (afterglow extinguishing time) was evaluated based on the flame retardancy (afterglow extinguishing time) evaluation of ASTP5007 of the MSHA standard (version 2012-02-12) using the evaluation samples obtained as described above.

A smaller numeric value of afterglow extinguishing time (unit: seconds) indicates superior flame retardancy.

Physical Properties in Normal State

Test Pieces

Vulcanized rubber sheets having a thickness of 2 mm were produced by vulcanizing each of the rubber compositions produced as described above by applying surface pressure of 3.0 MPa at 148° C. for 45 minutes using a press molding machine. A dumbbell-shaped JIS JIS (Japanese Industrial Standard) No. 3 test piece was punched from each of these sheets, and the test pieces were used in evaluation of physical properties in the normal state (the tensile test described below).

Tensile Test

Using the test piece described above, a tensile test was performed at a tensile test speed of 500 mm/minute at 23° C. in accordance with JIS K6251:2010, and tensile strength ($T_B$) [MPa] and elongation at break ($E_B$) [%] were measured.

Wear Resistance (Akron Wear Test)

Test Pieces

In evaluation of wear resistance, disk shaped test pieces having a diameter of 63.5±0.5 mm, thickness of 12.7±0.5 mm, and a center hole measuring 12.7±0.1 mm were produced by vulcanizing each of the rubber compositions produced as described above by applying surface pressure of 3.0 MPa at 148° C. for 45 minutes using a press molding machine.

Wear Test

Wear resistance (Akron wear test) was evaluated in accordance with JIS K 6264-2:2005 (Akron wear test method A, applied force 27 N, tilt angle 15 degrees, number of test rotations 1000 times), using the test pieces obtained as described above.

A smaller wear amount (unit: $mm^3$) indicates better wear resistance.

TABLE 1

|  | Comparative Example 1 | Example 1 | Example 2 | Example 3 | Example 4 | Example 5 |
| --- | --- | --- | --- | --- | --- | --- |
| CR | 85 | 85 | 85 | 85 | 60 | 100 |
| SBR | 7.5 | 15 | 15 | 15 | 40 | 0 |
| BR | 7.5 | 0 | 0 | 0 | 0 | 0 |
| Carbon black 1 | 0 | 43 | 45 | 50 | 47 | 43 |
| Carbon black 2 | 75 | 24 | 25 | 20 | 20 | 25 |
| Silica | 10 | 15 | 25 | 30 | 15 | 15 |
| Silica/carbon black | 0.13 | 0.22 | 0.36 | 0.43 | 0.22 | 0.22 |
| Flame retardancy Flame extinguishing time (seconds) | 50 | 35 | 30 | 25 | 45 | 35 |
| Flame retardancy Afterglow extinguishing time (seconds) | 120 | 85 | 75 | 65 | 110 | 70 |
| Physical properties in normal state $T_B$ (MPa) | 11.8 | 11.4 | 11.9 | 12.1 | 10.5 | 13.9 |
| Physical properties in normal state $E_B$ (%) | 370 | 380 | 370 | 370 | 420 | 340 |
| Wear resistance ($mm^3$) | 135 | 140 | 180 | 205 | 90 | 190 |

Details of the components shown in Table 1 are as follows.
CR: trade name: Denka Chloroprene S-41 (manufactured by Denki Kagaku Kogyo K.K.)
SBR: Styrene-butadiene rubber: trade name: Nipol 1502 (manufactured by Zeon Corporation), weight average molecular weight 500000, emulsion -polymerized SBR
BR: Butadiene rubber: trade name: Nipol BR 1220 (manufactured by Zeon Corporation)
Carbon black 1: FEF: trade name: Niteron #10N (manufactured by NSCC Carbon Co., Ltd.)
Carbon black 2: GPF: trade name: Niteron #GN (manufactured by NSCC Carbon Co., Ltd.)
Silica: trade name: Nipsil AQ (manufactured by Tosoh Silica Corporation)

TABLE 2

| Magnesium oxide | 4.0 |
| --- | --- |
| Stearic acid | 2.0 |
| Process oil | 10 |
| Aroma oil | 20 |
| Sulfur | 0.5 |
| Zinc oxide | 5.0 |
| Vulcanization accelerator TS | 1.0 |
| Vulcanization accelerator D-G | 1.0 |

Details of the components shown in Table 2 are as follows.
Magnesium oxide: trade name: Kyowamag 150 (manufactured by Kyowa Chemical Industry Co., Ltd.)
Stearic acid: trade name: Industrial Stearic Acid N (manufactured by Chiba Fatty Acid Co., Ltd.)
Process oil: trade name: Komorex H22 (manufactured by .IX Nippon Oil & Energy Corporation)
Aroma oil; trade name: A/O MIX 2010 (manufactured by Sankyo Yuka Kogyo K. K.)
Sulfur: trade name: Oil-Treated Sulfur (manufactured by Hosoi Chemical Industry Co., Ltd.)
Zinc oxide: trade name: Zinc Oxide III (manufactured by Seido Chemical Industry Co., Ltd.)
Vulcanization accelerator TS: trade name: Sanceler TS-G (manufactured by Sanshin Chemical Industry Co., Ltd.)
Vulcanization accelerator D-G: trade name: Sanceler D-G (manufactured by Sanshin Chemical Industry Co., Ltd.)

As is clear from the results shown in Table 1, Comparative Example 1, which contains butadiene rubber in addition to chloroprene rubber and styrene-butadiene rubber, had low flame retardancy.

In contrast, it was ascertained that the desired effect is obtained with the rubber compositions of the present technology.

When Examples 1 to 3 are compared in regard to silica/carbon black, those having a higher value of silica/carbon black have superior flame retardancy, while those having a smaller value of silica/carbon black have superior wear resistance.

When Examples 1 and 5, and Example 4 are compared in regard to chloroprene rubber content, Examples 1 and 5, which have a high chloroprene rubber content, have superior flame retardancy compared to Example 4.

The invention claimed is:

1. A rubber composition for a flame-retardant hose, the composition comprising:

a rubber component, a carbon black, and a silica;

the rubber component being only chloroprene rubber and styrene-butadiene rubber; wherein a content of the chloroprene rubber is not less than 70 parts by mass per 100 parts by mass of the rubber component; and a content of the carbon black is greater than 65 parts by mass and not greater than 90 parts by mass per 100 parts by mass of the rubber component.

2. The rubber composition for a flame-retardant hose according to claim 1, wherein a content of the silica is from 5 to 25 parts by mass per 100 parts by mass of the rubber component.

3. A flame-retardant hose comprising a rubber layer formed using the rubber composition for a flame-retardant hose described in claim 1.

* * * * *